United States Patent
Ishihara et al.

(10) Patent No.: US 7,327,821 B2
(45) Date of Patent: Feb. 5, 2008

(54) CASK, COMPOSITION FOR NEUTRON SHIELDING BODY, AND METHOD OF MANUFACTURING THE NEUTRON SHIELDING BODY

(75) Inventors: Nobuo Ishihara, Hyogo (JP); Katsunari Ohsono, Hyogo (JP); Kiichiro Sakashita, Hyogo (JP); Kiyoshi Ono, Hyogo (JP); Makio Atsumi, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 137 days.

(21) Appl. No.: 10/513,333

(22) PCT Filed: Oct. 30, 2003

(86) PCT No.: PCT/JP03/13944

§ 371 (c)(1),
(2), (4) Date: Nov. 12, 2004

(87) PCT Pub. No.: WO2004/079750

PCT Pub. Date: Sep. 16, 2004

(65) Prior Publication Data

US 2005/0157833 A1 Jul. 21, 2005

(30) Foreign Application Priority Data

Mar. 3, 2003 (JP) .............................. 2003-055828

(51) Int. Cl.
G21C 19/00 (2006.01)

(52) U.S. Cl. ................ 376/272; 250/518.1; 250/515.1; 250/505.1; 252/478

(58) Field of Classification Search ............. 250/515.1, 250/517.1, 518.1, 505.1; 252/478; 264/311; 376/272

See application file for complete search history.

(56) References Cited

U.S. PATENT DOCUMENTS

| | | | | |
|---|---|---|---|---|
| 4,230,660 | A | * 10/1980 | Taylor et al. | 264/311 |
| 5,245,195 | A | * 9/1993 | Shah et al. | 250/515.1 |
| 5,641,970 | A | 6/1997 | Taniuchi et al. | |
| 5,908,884 | A | * 6/1999 | Kawamura et al. | 523/136 |
| 6,517,743 | B2 | * 2/2003 | Anayama et al. | 252/478 |
| 6,605,817 | B1 | * 8/2003 | Nihei et al. | 250/518.1 |
| 6,608,319 | B2 | * 8/2003 | Joseph | 250/519.1 |
| 6,764,617 | B1 | * 7/2004 | Viswanathan et al. | 252/500 |
| 6,797,972 | B2 | * 9/2004 | Kamoshida et al. | 250/507.1 |
| 6,960,311 | B1 | * 11/2005 | Mirsky et al. | 252/478 |
| 7,160,486 | B2 | * 1/2007 | Valiere | 252/478 |

FOREIGN PATENT DOCUMENTS

| | | |
|---|---|---|
| EP | 0 628 968 A1 | 12/1994 |
| EP | 1093130 A1 * | 4/2001 |

(Continued)

Primary Examiner—Ricardo J. Palabrica
(74) Attorney, Agent, or Firm—Oblon, Spivak, McClelland, Maier & Neustadt, P.C.

(57) ABSTRACT

A cask includes a trunk body that includes a basket having a square pipe or a plate member forming a cell that contains a spent fuel assembly, and a neutron shield that is formed by filling a composition for neutron shielding between the trunk body and an outer cover surrounding the trunk body. The composition includes a refractory material, a density increasing agent, and a neutron shielding material composed mainly of a polymer.

18 Claims, 7 Drawing Sheets

FOREIGN PATENT DOCUMENTS

| | | |
|---|---|---|
| JP | 61-240197 | 10/1986 |
| JP | 63-085497 | 4/1988 |
| JP | 02-044295 | 2/1990 |
| JP | 03-025398 | 2/1991 |
| JP | 03-179056 | 8/1991 |
| JP | 06-180388 | 6/1994 |
| JP | 6-180389 | 6/1994 |
| JP | 3150672 | 1/2001 |
| JP | 2001-108787 | 4/2001 |
| JP | 2003-50294 | 2/2003 |
| JP | 2003-50295 | 2/2003 |
| JP | 2003-167091 | 6/2003 |
| JP | 2004-061463 | 2/2004 |

\* cited by examiner

CASK, COMPOSITION FOR NEUTRON SHIELDING BODY, AND METHOD OF MANUFACTURING THE NEUTRON SHIELDING BODY

TECHNICAL FIELD

The present invention relates to a composition for neutron shield, and more particularly, to a composition for a neutron suitable for a cask for storing and transporting spent fuel, and a cask using the composition for neutron shield.

BACKGROUND ART

As the nuclear industry is making progress recently, various nuclear facilities, such as reactors and fuel reprocessing plants, are built in many places. In these nuclear facilities, there is a need to render the irradiation dose of a human body as low as possible and prevent the structural materials and materials for equipment from suffering from damage due to irradiation. Specifically, neutrons generated from fuel or spent fuel (or recycle fuel) in the nuclear facilities have high energy and high penetrating power, and collide with a substance to generate γ-rays, causing the materials in the nuclear facilities to suffer from the damage. Therefore, a neutron shield which can surely shield neutrons and γ-rays with safety is being developed.

Concrete has been conventionally used as a neutron shield, however, when the concrete is used as a shielding wall, it needs a considerable thickness and hence is unsuitable for neutron shield in a nuclear facility having a limited capacity, such as a nuclear ship, and therefore a neutron shield having a reduced thickness has been desired.

When a neutron, especially fast neutron collides with a hydrogen element having substantially the same mass, the hydrogen absorbs energy of the neutron, achieving effective neutron moderation. Therefore, a material having a high hydrogen density, namely, high hydrogen content is effective in shielding fast neutrons, and, for example, water, paraffin, or polyethylene can be used as a neutron shield. A liquid such as water is lightweight, as compared to concrete, but the liquid has a limited form of handling, and further a material for a container itself for containing a liquid, such as water, must be considered in respect of the neutron shielding ability.

Therefore, for shielding neutrons, there are used materials obtained by incorporating a slight amount of a boron compound as a neutron shielding material into a resin having such a high hydrogen content that it remarkably effectively serves as a neutron moderator, for example, a polyolefin thermoplastic resin, such as paraffin or polyethylene, a thermosetting resin, such as an unsaturated polyester resin, or an epoxy resin. On the other hand, for shielding γ-rays, a structure for shielding γ-rays having a form such that it surrounds the neutron shield body is provided.

Further, the development of a neutron shield which can maintain the neutron shielding ability at a certain level or more even when a fire occurs is made. With respect to this, a neutron shield having incorporated thereinto a large amount of aluminum hydroxide powder or magnesium hydroxide powder as a refractory material has been proposed (Japanese Patent Application Laid-open No. 2001-108787, Japanese Patent Publication No. 3150672).

However, in the shielding neutrons, a neutron shield which can more surely shield neutrons with safety is desired. On the other hand, in the shielding γ-rays, the neutron shield comprised of a resin, which is mainly used currently, has a specific gravity as small as 0.9 to 1.2 and hence is not suitable for shielding γ-rays generated when shielding fast neutrons. Therefore, there has been a need to provide a structure for shielding γ-rays using a material having a larger specific gravity around the neutron shield body. In other words, the current neutron shield cannot satisfy itself both the neutron shielding ability and the γ-ray shielding ability.

The fact that there is a need to provide a structure for shielding γ-rays using a material having a larger specific gravity around the neutron shield body is not the best mode in a nuclear facility having a limited capacity, and the improvement of the neutron shield not only in the neutron shielding ability but also in the γ-ray shielding ability is expected.

With respect to the fire resistance, the dehydration heat decomposition temperature of aluminum hydroxide is 245° C. to 320° C., whereas, the dehydration heat decomposition temperature of magnesium hydroxide is 340° C. to 390° C., and therefore it is considered that magnesium hydroxide powder is more suitable as a refractory material. However, when magnesium hydroxide powder is used, there are a problem that the viscosity of the resultant composition increases and kneading and filling of the composition require a prolonged time and burdensome operations, and a problem that voids caught in the resin are likely to remain to lower the neutron shielding ability. For this reason, there has been no example of actual use of magnesium hydroxide powder in the cask, and no example of studies on the particle size of magnesium hydroxide powder, either.

The present invention has been achieved with a view to the above problems, and an object of the invention is to provide a composition for neutron shield, which is advantageous not only in that it effectively shields both neutrons and γ-rays, but also in that it has excellent fire resistance, and a cask using the same. It is also an object of the invention to provide a composition for neutron shield having excellent workability.

DISCLOSURE OF THE INVENTION

It is an object of the present invention to solve at least the above problems.

The cask according to one aspect of the present invention includes a trunk body that includes a basket having a square pipe or a plate member forming a cell that contains a spent fuel assembly, and a neutron shield that is formed by filling a composition for neutron shield between the trunk body and an outer cover surrounding the trunk body. The composition includes a refractory material, a density increasing agent, and a neutron shielding material composed mainly of a polymer.

The cask according to another aspect of the present invention includes a trunk body that includes a basket having a square pipe or a plate member forming a cell that contains a spent fuel assembly; and a neutron shield that is formed by filling a composition for neutron shield between the trunk body and an outer cover surrounding the trunk body. The composition includes magnesium hydroxide powder having a particle size of 1.5 micrometers to 15 micrometers as a refractory material, a density increasing agent, and a neutron shielding material composed mainly of a polymer.

The composition for a neutron shield according to still another aspect of the present invention includes a neutron shielding material composed mainly of a polymer, and magnesium hydroxide powder having a particle size of 1.5 micrometers to 15 micrometers.

The composition for a neutron shield according to still another aspect of the present invention includes a neutron shielding material composed mainly of a polymer, a refractory material, and a density increasing agent.

The composition for a neutron shield according to still another aspect of the present invention includes 20 mass percent to 55 mass percent of neutron shielding material composed mainly of a polymer, a curing agent of 4 mass percent to 55 mass percent, a refractory material of 5 mass percent to 60 mass percent, a density increasing agent of 5 mass percent to 40 mass percent, and a boron compound of 0.5 mass percent to 10 mass percent.

The method of producing a neutron shield according to still another aspect of the present invention includes, where the neutron shield includes a neutron shielding material composed mainly of a polymer as a constituent, and is capable of enhancing neutron shielding effect while maintaining γ-ray shielding performance, replacing the constituent other than the neutron shielding material composed mainly of a polymer with a density increasing agent to maintain specific gravity of a composition for the neutron shield within a range of 1.62 g/cm$^3$ and 1.72 g/cm$^3$.

These and other objects, features, and advantages of the present invention will become apparent from the following detailed descriptions.

BEST MODE FOR CARRYING OUT THE INVENTION

Figure 1:
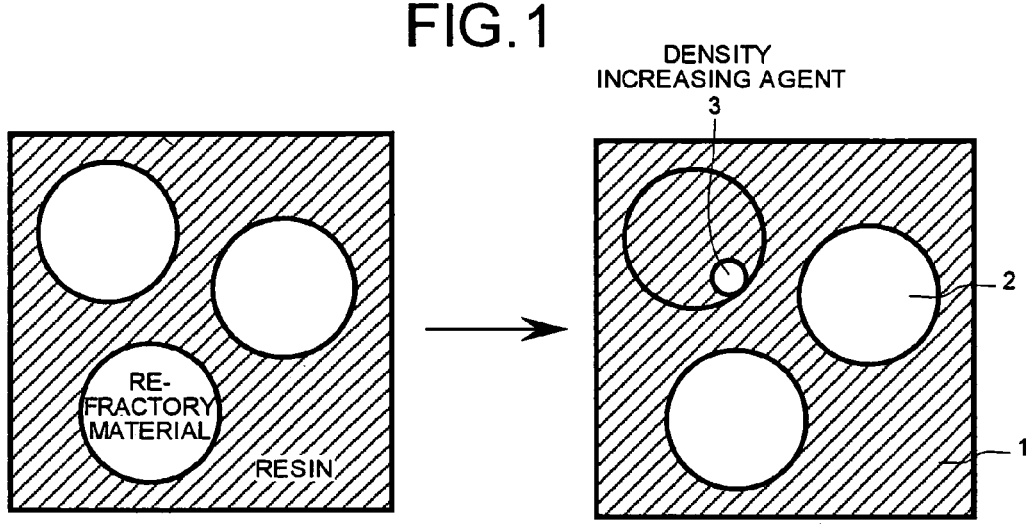
FIG. 1 is a conceptual view for depicting one embodiment of a composition for neutron shield according to the present invention.

Exemplary embodiments of the present invention are described below in detail. However, the present invention is not limited by the embodiments. In the present specification and the drawings, "composition for neutron shield" is synonym for "resin".

First, the composition for neutron shield of the present invention is described. The composition for neutron shield includes, as basic constituents, a mixture of a neutron shielding material comprised mainly of a polymer as a base material, a curing agent, and a boron compound. By mixing a refractory material into the basic constituents, flame retardancy can be imparted to the composition. By further mixing any one of carbon powder and a density increasing agent or both, the γ-ray shielding ability, the neutron shielding ability, and the workability can be further improved. The components of the composition are individually described in detail below, and commercially available products can be used unless otherwise specified.

Representative examples of neutron shielding materials comprised mainly of a polymer include polyolefin resins, such as polyethylene, polypropylene, and polybutylene, and epoxy resins. The epoxy resin means a resin containing an epoxy group capable of cross-linking.

Examples of epoxy resins include glycidyl ether/difunctional phenolic epoxy resins, glycidyl ether/multifunctional phenolic epoxy resins, glycidyl ether/alcohol epoxy resins, glycidyl ester epoxy resins, aliphatic epoxy resins, alicyclic epoxy resins, and modified epoxy resins, and hydrogenated epoxy resins obtained by hydrogenating the cyclic structure of these epoxy resins. Among these, preferred are hydrogenated epoxy resins. Either one of the epoxy resins or a mixture of the two or more epoxy resins may be used.

Further, specific examples of epoxy resins are as follows: examples of glycidyl ether/difunctional phenolic epoxy resins include bisphenol epoxy resins, stilbene epoxy resins, biphenyl epoxy resins, monocyclic aromatic epoxy resins, and condensed polycyclic aromatic epoxy resins; examples of glycidyl ether/multifunctional phenolic epoxy resins include polyphenolic epoxy resins, phenolic novolak epoxy resins, methylene group-substituted phenolic novolak epoxy resins, alkylene-modified phenolic novolak epoxy resins, and aralkyl-modified phenolic novolak epoxy resins; examples of aliphatic epoxy resins include alicyclic epoxy resins obtained by direct oxidation, alicyclic epoxy resins obtained by glycidyletherification of a functional group, dicyclopentadiene epoxy resins, and linear aliphatic epoxy resins; examples of modified epoxy resins include silicone-modified epoxy resins, urethane-modified epoxy resins, polyimide- or polyamide-modified epoxy resins, photocuring epoxy resins, phosphorus-containing epoxy resins, sulfur-containing epoxy resins, and nitrogen-containing epoxy resins. Examples of hydrogenated epoxy resins include hydrogenated bisphenol A epoxy resins, hydrogenated bisphenol F epoxy resins, and resins obtained by hydrogenating a novolak glycidyl ether resin.

Among the epoxy resins which are not hydrogenated, preferred are bisphenol epoxy resins and aliphatic epoxy resins. Especially preferred are hydrogenated epoxy resins, such as hydrogenated bisphenol A epoxy resins obtained by hydrogenating the cyclic structure of a bisphenol epoxy resin. By using a hydrogenated epoxy resin having a high hydrogen content, such as a hydrogenated bisphenol A epoxy resin, a neutron shield having more excellent neutron shielding ability can be produced.

Hydrogenated Bisphenol A Epoxy Resin

In the structural formula of the hydrogenated bisphenol A epoxy resin, the range of n is preferably 0 to 2, more preferably about 0 to 0.1.

The content of the neutron shielding material comprised mainly of a polymer in the composition varies depending on the type of the neutron shielding material used or the types or contents of the other components and hence is difficult to specify, but the neutron shielding material content may be 20 mass percent to 55 mass percent, preferably 24 mass percent to 47 mass percent, more preferably 35 mass percent to 42 mass percent, based on the mass of the composition. When the neutron shielding material content is less than 20 mass percent, the neutron shielding ability tends to become poor, and, when the content is more than 55 mass percent, the balance between the neutron shielding material and the other components is poor.

A curing agent is appropriately selected depending on the type of the neutron shielding material comprised mainly of a polymer. Specifically, examples of curing agents capable of reacting with an epoxy resin to form a cross-linked structure include amine curing agents, acid or acid anhydride curing agents, and phenolic curing agents, and amine curing agents are preferably used. Among the amine curing agents, curing agents having a cyclic structure, such as alicyclic amine curing agents and aromatic amine curing agents, have excellent heat resistance and hence are advantageously used in the composition of the present invention. Either one of the curing agents or a mixture of the two or more curing agents may be used.

The preferred amount of the curing agent added varies depending on the type of the curing agent used or the types or contents of the other components and hence is difficult to specify, but, when, for example, an amine curing agent is used, the amount of the curing agent added may be 4 mass percent to 55 mass percent, preferably 4.5 mass percent to 30 mass percent, especially preferably 6 mass percent to 15 mass percent, based on the mass of the composition. When the amount of the curing agent added is less than 4 mass percent, only an unsatisfactory effect of addition of the curing agent is obtained, and, when the amount is more than 55 mass percent, curing of the composition is too rapid to secure a working time required for filling.

A refractory material is added for the purpose of making the neutron shield possible to remain while maintaining the neutron shielding ability at a certain level or more when the neutron shield is exposed to high temperature, for example, when a fire occurs, and the refractory material is a compound, such as aluminum hydroxide or magnesium hydroxide. Magnesium hydroxide has a dehydration decomposition temperature of 340° C. to 390° C., which is higher than the dehydration decomposition temperature of aluminum hydroxide, and therefore magnesium hydroxide is especially preferred as the refractory material.

Generally, magnesium hydroxide is in the form of powder. The particle size of magnesium hydroxide powder is generally not particularly adjusted. By using magnesium hydroxide powder having a particle size adjusted, the resultant composition for neutron shield is more preferred.

When magnesium hydroxide powder is used as the refractory material, the magnesium hydroxide powder preferably has a particle size of 1.5 micrometers to 15 micrometers, especially preferably 1.5 micrometers to 5 micrometers. As the magnesium hydroxide powder having the above particle size, a commercially available product can be used. With respect to the particle size of the magnesium hydroxide powder, it is desired that the particle size of the whole of the powder falls in the range of 1.5 micrometers to 15 micrometers, but, actually, the particle size of 80% or more of the magnesium hydroxide powder may fall in the range of 1.5 micrometers to 15 micrometers, and it is desired that preferably the particle size of 90% or more, especially preferably 95% or more of the magnesium hydroxide powder falls in the above range. When the content of the magnesium hydroxide powder having a particle size less than 1.5 micrometers in the composition is increased, the viscosity of the composition increases and kneading and filling of the composition require a prolonged time and burdensome operations. Therefore, the magnesium hydroxide powder content must be lowered, so that the fire resistance becomes poor. On the other hand, when the magnesium hydroxide powder having a particle size more than 15 micrometers is used, the total surface area of the magnesium hydroxide powder is reduced, so that the fire resistance may become poor. That is, by using the magnesium hydroxide powder having a particle size of 1.5 micrometers to 15 micrometers, a composition for neutron shield having excellent fire resistance and excellent workability such that neither a prolonged time nor burdensome operations are required in kneading or filling of the composition can be obtained.

Further, specifically, from the viewpoint of obtaining excellent neutron shielding ability, for preventing generation of voids in the epoxy resin before being cured when charging the resin into a container, it is desired that the resin before being cured has a viscosity equal to or less than 100 Pa·s. When the magnesium hydroxide powder having a particle size less than 1.5 micrometers is used, the magnesium hydroxide powder content is 30 mass percent or less for keeping the viscosity appropriate, and voids may be generated in the resin in a closed container with a molten stopper under fire resistance temperature conditions (at an external temperature of 800° C. for 30 minutes) to lower the neutron shielding ability. On the other hand, when the magnesium hydroxide powder having a particle size more than 15 micrometers is used, the magnesium hydroxide powder content can be 50 mass percent or more, but the surface area of the magnesium hydroxide powder is reduced, and hence voids may be generated in the resin under fire resistance temperature conditions (at an external temperature of 800° C. for 30 minutes) to lower the neutron shielding ability.

Therefore, when using the magnesium hydroxide powder having a particle size of 1.5 micrometers to 15 micrometers, a neutron shield having more excellent fire resistance and neutron shielding ability can be obtained. In addition, the workability is improved.

On the other hand, aluminum hydroxide is more excellent in respect of the hydrogen content than magnesium hydroxide, and therefore aluminum hydroxide powder and magnesium hydroxide powder may be appropriately mixed and used as the refractory material. In such a case, as the aluminum hydroxide powder, it is preferred to use aluminum hydroxide powder having a soda content as low as 0.07 mass percent or less. When the soda content (Na2O) of the aluminum hydroxide powder is 0.07 mass percent or less, the hydrogen content can be kept at up to 150° C. or higher. A refractory material other than the aluminum hydroxide powder and magnesium hydroxide powder may be added.

The amount of the refractory material added varies depending on the type of the refractory material used or the types or contents of the other components and hence is difficult to specify, but the amount of the refractory material added is preferably 5 mass percent to 60 mass percent, especially preferably 33 mass percent to 41 mass percent, based on the mass of the composition. When the amount of the refractory material added is less than 5 mass percent, only an unsatisfactory effect of addition of the refractory material is obtained, and, when the amount is more than 60 mass percent, the content of the neutron shielding material comprised mainly of a polymer is reduced to lower the neutron absorbing ability.

A density increasing agent may be any material as long as the material has a high density and can increase the specific gravity of the neutron shield, and does not adversely affect the other components. The density increasing agent which effectively shields γ-rays may have a density equal to or more than 5.0 g/cm3, preferably 5.0 g/cm3 to 22.5 g/cm3, more preferably 6.0 g/cm3 to 15 g/cm3. When the density is less than 5.0 g/cm3, the density increasing agent hardly effectively shields γ-rays without sacrificing the neutron shielding ability, and, when the density is more than 22.5 g/cm3, the effect expected by addition of the density increasing agent cannot be obtained.

As specific examples, there can be mentioned metal powder and metal oxide powder. Preferred examples of density increasing agents include metals having a melting point equal to or higher than 350° C., such as Cr, Mn, Fe, Ni, Cu, Sb, Bi, U, and W; metal oxides having a melting point equal to or higher than 1000° C., such as NiO, CuO, ZnO, ZrO2, SnO, SnO2, WO2, UO2, PbO, and WO3, and lanthanoid oxides; and combinations thereof. Among these, especially preferred are Cu, WO2, WO3, ZrO2, and CeO2, since they are advantageous from the viewpoint of the cost. Either one of the density increasing agents or a mixture of the two or more density increasing agents may be used.

There is no particular limitation for the particle size of the density increasing agent, but the density increasing agent having too large particle size may settle during the production, and hence it is preferred that the density increasing agent has such a small particle size that it does not settle. The particle size of the density increasing agent which does not settle is largely affected by conditions of the composition (e.g., temperature, viscosity, or curing rate of the composition) and therefore it cannot be specified simply by a value.

By adding the density increasing agent, the specific gravity of the neutron shield can be increased, making it possible to more effectively shield γ-rays. The use of the metal powder or metal oxide powder can also improve fire resistance.

By replacing part of the components other than the neutron shielding material comprised mainly of a polymer, mainly replacing part of the refractory material by the density increasing agent, the hydrogen content can be increased. By mainly replacing part of the refractory material by the density increasing agent, the epoxy resin content can be increased while maintaining the specific gravity (1.62 g/cm3 to 1.72 g/cm3) of the composition for neutron shield, so that a neutron shield having a high hydrogen content can be produced, making it possible to effectively shield neutrons. That is, both excellent neutron shielding ability and excellent γ-ray shielding ability can be achieved.

The amount of the density increasing agent added can be appropriately controlled so as to keep the specific gravity (1.62 g/cm3 to 1.72 g/cm3) of the composition for neutron shield. Specifically, the amount of the density increasing agent added varies depending on the type of the density increasing agent used or the types or contents of the other components and hence is difficult to specify, but the amount of the density increasing agent added may be 5 mass percent to 40 mass percent, preferably 9 mass percent to 35 mass percent, based on the mass of the composition. When CeO2 is used, the amount is especially preferably 15 mass percent to 20 mass percent. When the amount of the density increasing agent added is less than 5 mass percent, the effect expected by the addition is difficult to exhibit, and, when the amount is more than 40 mass percent, it is difficult to keep the specific gravity of the composition in the range of 1.62 g/cm3 to 1.72 g/cm3.

Specific embodiments using the density increasing agent will be described in more detail below with reference to the accompanying drawings.

FIG. 1 is a conceptual view for depicting an example of the construction of the neutron shield according to the present embodiment. The hatched portions in the figure diagrammatically show the hydrogen content.

Specifically, as shown in FIG. 1, the neutron shield according to the present embodiment is obtained by mixing, into a neutron shielding material 1 comprised mainly of a polymer, a refractory material 2 and a density increasing agent 3 having a density higher than that of the refractory material 2.

Particularly, by mixing metal powder or metal oxide powder as the density increasing agent 3, a neutron shield having an increased hydrogen content (in the range of 1.62 g/ml to 1.72 g/ml) while maintaining the density of the material is formed.

The density increasing agent 3 to be mixed may have a density equal to or more than 5.0 g/ml, preferably 5.0 g/ml to 22.5 g/ml, more preferably 6.0 g/ml to 15 g/ml.

As the density increasing agent 3, it is preferred to mix metal powder having a melting point equal to or higher than 350° C. or metal oxide powder having a melting point equal to or higher than 1000° C.

As materials for the powder, examples of metals include Cr, Mn, Fe, Ni, Cu, Sb, Bi, U, and W.

Examples of metal oxides include NiO, CuO, ZnO, ZrO2, SnO, SnO2, WO2, CeO2, UO2, PbO, and WO3.

Representative examples of the neutron shielding materials 1 comprised mainly of a polymer include polyolefin resins, such as polyethylene, polypropylene, and polybutylene, and epoxy resins.

In the neutron shield having the construction according to the present embodiment, by mixing, into the neutron shielding material (resin) 1 comprised mainly of a polymer, the refractory material 2 and the density increasing agent 3 having a density higher than that of the refractory material 2, the hydrogen content can be increased while maintaining the density at a predetermined value (in the range of 1.62 g/ml to 1.72 g/ml).

Specifically, the refractory material 2 has a slightly higher density and a slightly smaller hydrogen content than those of the neutron shielding material 1.

Therefore, part of the refractory material 2 is replaced by the density increasing agent 3 containing no hydrogen so that the densities are equivalent.

By determining the individual density and hydrogen content by making calculation to achieve appropriate replacement, part of the refractory material 2 having a slightly smaller hydrogen content can be replaced by the neutron shielding material 1 containing a large amount of hydrogen to increase the hydrogen content.

Therefore, the neutron absorption can be increased while maintaining the secondary γ-ray shielding ability, so that the neutron shielding ability can be improved without providing a conventional structure for shielding γ-rays around the neutron shield body. In the neutron shield according to the present embodiment, when the density of the density increasing agent 3 mixed is equal to or more than 5.0 g/ml, preferably 5.0 g/ml to 22.5 g/ml, more preferably 6.0 g/ml to 15 g/ml, the above effect can be further remarkable.

Figure 2:
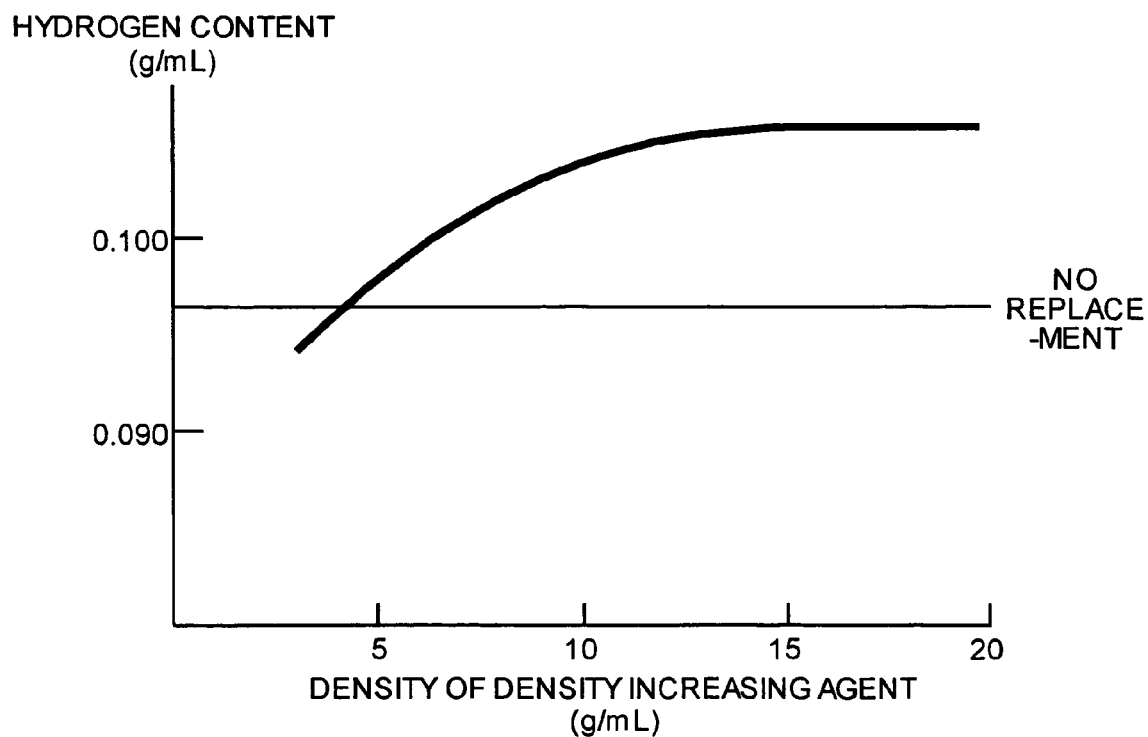
FIG. 2 is a characteristic diagram of the relationship between the density and the hydrogen content of a density increasing agent in the composition for neutron shield according to the present invention.

Specifically, FIG. 2 is a characteristic diagram of the relationship between the density and the hydrogen content of the density increasing agent 3.

In FIG. 2, the hydrogen content is shown when the base resin 1 having a hydrogen content of 0.0969 g/ml and a density of 1.64 g/ml including the refractory material 2 (magnesium hydroxide) is used and the refractory material 2 is replaced by the density increasing agent 3 so that the density is fixed.

The density of the magnesium hydroxide as the refractory material 2 is 2.36 g/ml.

As shown in FIG. 2, the effect is not necessarily obtained when the density of the density increasing agent is equal to or more than the density (2.36 g/ml) of the refractory material 2. Specifically, the boundary is the density slightly higher than the density (2.36 g/ml) of the refractory material 2, although changing depending on the combination of the base resin 1 and refractory material 2. As seen in FIG. 2, when the density of the density increasing agent 3 is equal to or more than 5.0 g/ml, preferably equal to or more than 6.0 g/ml, the effect is obtained. When the density of the density increasing agent 3 is more than 22.5 g/ml, the effect expected by the addition is not obtained.

Figure 3:
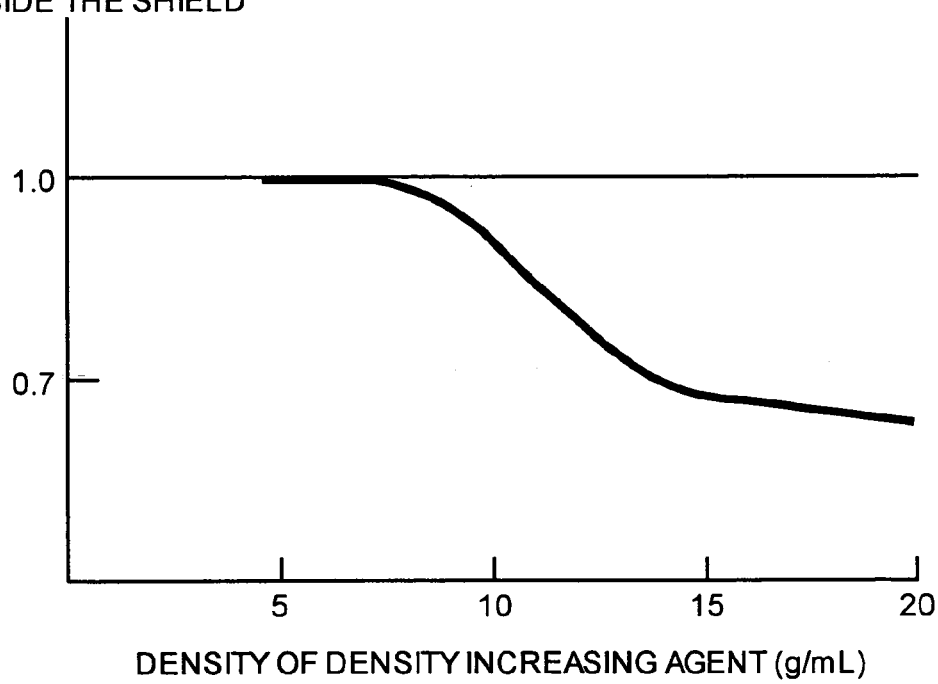
FIG. 3 is a characteristic diagram of the relationship between the density of the density increasing agent according to the present invention and the (neutron+secondary γ-ray) radiation dose ratio outside the neutron shield.

FIG. 3 is a characteristic diagram of the relationship between the density of the density increasing agent 3 and the (neutron+secondary γ-ray) radiation dose ratio outside the neutron shield.

In FIG. 3, the shielding effect is shown when the base resin 1 having a hydrogen content of 0.0969 g/ml and a density of 1.64 g/ml including the refractory material 2 (magnesium hydroxide) is used and the refractory material 2 is replaced by the density increasing agent 3 so that the density is fixed.

The radiation dose of the base resin 1 outside the shield is taken as 1.

As shown in FIG. 3, when the density of the density increasing agent 3 is equal to or more than 5.0 g/ml, more preferably equal to or more than 6.0 g/ml, the effect is obtained. When the density of the density increasing agent 3 is more than 22.5 g/ml, the effect expected by the addition is not obtained.

Further, in the neutron shield according to the present embodiment, by mixing, as the density increasing agent 3, metal powder having a melting point equal to or higher than 350° C. (such as Cr, Mn, Fe, Ni, Cu, Sb, Bi, U, or W) or metal oxide powder having a melting point equal to or higher than 1000° C. (such as NiG, CuG, ZnO, ZrO2, SnO, SnO2, WO2, CeO2, UO2, PbO or WO3), the fire resistance can be improved.

As mentioned above, in the neutron shield according to the present embodiment, the hydrogen content can be increased while maintaining the density of the material at a fixed value without lowering it, so that the neutron shielding ability can be improved without providing a conventional structure for shielding γ-rays around the neutron shield body.

Second Embodiment

The neutron shield according to the present embodiment is, as shown in FIG. 1, obtained by mixing, into an epoxy resin having a low hydrogen content as the neutron shielding material 1 comprised mainly of a polymer, the refractory material 2 and density increasing agent 3 having a density higher than that of the refractory material 2, and then processing the resultant mixture by curing and shaping.

Particularly, by mixing metal powder or metal oxide powder as the density increasing agent 3, a neutron shield comprised of a cured epoxy resin having a low hydrogen content is formed.

The density increasing agent 3 to be mixed may have a density equal to or more than 5.0 g/ml, preferably 5.0 g/ml to 22.5 g/ml, more preferably 6.0 g/ml to 15 g/ml.

As the density increasing agent 3, it is preferred to mix metal powder having a melting point equal to or higher than 350° C. or metal oxide powder having a melting point equal to or higher than 1000° C.

As materials for the powder, examples of metals include Cr, Mn, Fe, Ni, Cu, Sb, Bi, U, and W.

Examples of metal oxides include NiO, CuO, ZnO, ZrO2, SnO, SnO2, WO2, CeO2, UO2, PbO, PbO, and WO3.

Representative examples of the neutron shielding materials 1 comprised mainly of a polymer include, in addition to epoxy resins, polyolefin resins, such as polyethylene, polypropylene, and polybutylene.

In the neutron shield having the above construction according to the present embodiment, by mixing, into the neutron shielding material 1 comprised mainly of a polymer, the refractory material 2 and density increasing agent 3 having a density higher than that of the refractory material 2, the hydrogen content can be increased while maintaining the density of the material at a predetermined value (in the range of 1.62 g/ml to 1.72 g/ml) without lowering it.

Specifically, the refractory material 2 has a slightly higher density and slightly smaller hydrogen content than those of the neutron shielding material 1.

Therefore, part of the refractory material 2 is replaced by the density increasing agent 3 containing no hydrogen so that the densities are equivalent.

By determining the individual density and hydrogen content by making calculation to achieve appropriate replacement, part of the refractory material 2 having a slightly smaller hydrogen content can be replaced by the neutron shielding material 1 containing a large amount of hydrogen to increase the hydrogen content.

As a result, the neutron absorption can be increased while maintaining the secondary γ-ray shielding ability, so that the neutron shielding ability can be improved without providing a conventional structure for shielding γ-rays around the neutron shield body.

In the neutron shield according to the present embodiment, when the density of the density increasing agent 3 mixed is equal to or more than 5.0 g/ml, preferably 5.0 g/ml to 22.5 g/ml, more preferably 6.0 g/ml to 15 g/ml, the above effect can be further remarkable.

Specifically, FIG. 2 is a characteristic diagram of the relationship between the density and the hydrogen content of the density increasing agent 3.

In FIG. 2, the hydrogen content is shown when the base resin 1 having a hydrogen content of 0.0969 g/ml and a density of 1.64 g/ml including the refractory material 2 (magnesium hydroxide) is used and the refractory material 2 is replaced by the density increasing agent 3 so that the density is fixed.

The density of the magnesium hydroxide as the refractory material 2 is 2.36 g/ml.

As shown in FIG. 2, the effect is not necessarily obtained when the density of the density increasing agent is equal to or more than the density (2.36 g/ml) of the refractory material 2. Specifically, the boundary is the density slightly higher than the density (2.36 g/ml) of the refractory material 2, although changing depending on the combination of the base resin 1 and refractory material 2. As shown in FIG. 2, when the density of the density increasing agent 3 is equal to or more than 5.0 g/ml, preferably equal to or more than 6.0 g/ml, the effect is obtained. When the density of the density increasing agent 3 is more than 22.5 g/ml, the effect expected by the addition is not obtained.

FIG. 3 is a diagram of the relationship between the density of the density increasing agent 3 and the (neutron+secondary γ-ray) radiation dose ratio outside the neutron shield.

In FIG. 3, the shielding effect is shown when the base resin 1 having a hydrogen content of 0.0969 g/ml and a density of 1.64 g/ml including the refractory material 2

(magnesium hydroxide) is used and the refractory material 2 is replaced by the density increasing agent 3 so that the density is fixed.

The radiation dose of the base resin 1 outside the shield is taken as 1.

As shown in FIG. 3, when the density of the density increasing agent 3 is equal to or more than 5.0 g/ml, preferably equal to or more than 6.0 g/ml, the effect is obtained. When the density of the density increasing agent 3 is more than 22.5 g/ml, the effect expected by the addition is not obtained.

Further, in the neutron shield according to the present embodiment, by mixing, as the density increasing agent 3, metal powder having a melting point equal to or higher than 350° C. (such as Cr, Mn, Fe, Ni, Cu, Sb, Bi, U, or W) or metal oxide powder having a melting point equal to or higher than 1000° C. (such as NiO, CuO, ZnO, ZrO2, SnO, SnO2, WO2, CeO2, UO2, PbO, PbO, or WO3), fire resistance can be improved.

As mentioned above, in the neutron shield according to the present embodiment, the hydrogen content can be increased while maintaining the density of the material at a fixed value without lowering it, so that the neutron shielding ability can be improved without providing a conventional structure for shielding γ-rays around the neutron shield body.

In other words, by using the density increasing agent, the neutron shielding effect cab be further improved while maintaining the γ-ray shielding ability, and therefore there is almost no need to provide a conventional thick structure for shielding γ-rays around the neutron shield body.

A boron compound is incorporated in a slight amount and serves as a neutron moderator or absorber. The boron compound incorporated in a slight amount into the neutron shield may be any boron compound having a neutron absorbing ability, and examples include boron compounds having a large absorption cross-section with respect to slow and thermal neutrons, such as boron nitride, boric anhydride, iron borate, orthoboric acid, boron carbide, and metaboric acid, and especially preferred is boron carbide since it has excellent chemical stability (it does not change due to temperature changing or does not absorb water) and does not adversely affect the neutron shielding material comprised mainly of a polymer. Either one of the boron compounds or a mixture of the two or more boron compounds may be used.

The boron compound is used in the form of powder, and the particle size and amount of the boron compound added can be appropriately controlled. From the viewpoint of obtaining excellent dispersibility of the boron compound in an epoxy resin and excellent neutron shielding ability, the boron compound preferably has an average particle size of about 1 micrometer to 200 micrometers, more preferably about 10 micrometers to 100 micrometers, especially preferably about 20 micrometers to 50 micrometers. The amount of the boron compound added varies depending on the type of the boron compound used or the types or contents of the other components and hence is difficult to specify, but the amount of the boron compound added is preferably 0.5 mass percent to 10 mass percent, especially preferably 0.5 mass percent to 3 mass percent, based on the mass of the composition. When the amount of the boron compound added is less than 0.5 mass percent, the effect of the boron compound as a neutron shielding material is unsatisfactory, and, when the amount is more than 10 mass percent, it is difficult to uniformly disperse the boron compound.

From the viewpoint of obtaining excellent neutron shielding ability and excellent γ-ray shielding ability as well as excellent fire resistance, a preferred composition for neutron shield comprises 38 wt % of a hydrogenated epoxy resin, 8 wt % of an amine curing agent, 35 wt % of a refractory material (MgOH2), 18 wt % of a density increasing agent (CeO2), and 1 wt % of B4C.

Carbon powder is added for further improving the neutron shielding ability. Specifically, when the resin before being cured in a closed container with a molten stopper is under fire resistance temperature conditions (at an external temperature of 800° C. for 30 minutes), voids are likely to be generated in the resin to lower the neutron shielding ability. The addition of carbon powder suppresses generation of voids, further improving the neutron shielding ability.

Examples of carbon powder to be added include carbon black, graphite, and activated carbon, and especially preferred is carbon black since it is easily commercially available and advantageous in cost. Either one type of the carbon powder or a mixture of two or more types of the carbon powder may be used. The amount of the carbon powder added can be appropriately controlled depending on the type of the carbon powder used, and, when carbon black is used, the amount is preferably 0.02 mass percent to 4 mass percent, especially preferably 0.05 mass percent to 0.3 mass percent. The effect of the carbon powder is obtained when added in an amount larger than 0.02 mass percent, and the effect is especially remarkable when added in an amount larger than 0.05 mass percent. When the amount of the carbon powder added is 0.3 mass percent or less, no remarkable increase is found in the viscosity of the composition. On the other hand, when the amount is more than 4 mass percent, the viscosity of the composition rapidly increases due to the addition of the carbon powder and the hydrogen content is lowered by the amount of the carbon powder added, so that the effect expected by the addition of the carbon powder in such a large amount is not obtained.

When excess carbon powder is added, the content of the other components in the neutron shield is lowered, and therefore the hydrogen content is lowered, so that the neutron shielding ability is likely to become poor.

With respect to the particle size of the carbon powder, there is no particular limitation, but the carbon powder having too large a particle size may settle during the production, and hence it is preferred that the carbon powder has such a small particle size that it does not settle. The particle size of the carbon powder which does not settle is largely affected by conditions of the composition (e.g., temperature, viscosity, or curing rate of the composition) and therefore it cannot be specified simply by a value.

In the composition for neutron shield of the present invention, as filler, powder of silica, alumina, calcium carbonate, antimony trioxide, titanium oxide, asbestos, clay, or mica, or glass fiber may added, and, if necessary, carbon fiber may added. Further, if necessary, as a releasing agent, a natural wax, a metal salt of a fatty acid, an acid amide, or a fatty acid ester, as a flame retardant, paraffin chloride, bromotoluene, hexabromotoluene, or antimony trioxide, as a coloring agent, carbon black or red oxide, or a silane coupling agent or a titanium coupling agent can be added.

The composition of the present invention is prepared by mixing an epoxy resin with other components. The neutron shield is obtained by shaping the composition for neutron shield. In the shaping of the neutron shield, cross-linking for the epoxy resin can be made at room temperature, but the cross-linking is preferably made by heating. Specific conditions for the cross-linking vary depending on the type of the epoxy resin and the formulation, but it is preferred that the cross-linking is conducted by heating under temperature conditions of 50° C. to 200° C. for 1 hour to 3 hours. Further;

it is preferred that the heating treatment comprises two steps, and it is preferred that the heating treatment comprises heating at 60° C. to 90° C. for 1 hour to 2 hours and subsequent heating at 120° C. to 150° C. for 2 hours to 3 hours.

The neutron shield is used for the purpose of shielding neutrons, for example, in a cask used for storage or transport of spent fuel. Such a cask for transport can be produced utilizing a known technique. The cask is a container for containing or storing spent fuel assembly after burning. The nuclear fuel assembly, which is caused at the final stage in the nuclear fuel cycle and cannot be used after burning, is called spent fuel (recycle fuel). The spent fuel contains highly radioactive substances, such as fission products (FP), and is required to be thermally cooled, and therefore it is cooled in a cooling pit in a nuclear power station for a predetermined term (3 months to 6 months). The resultant fuel is then placed in a cask as a shielding container; and carried by a truck or a ship to a reprocessing facility and stored. The cask of the present invention is described in more detail below with reference to the accompanying drawings.

Figure 4:
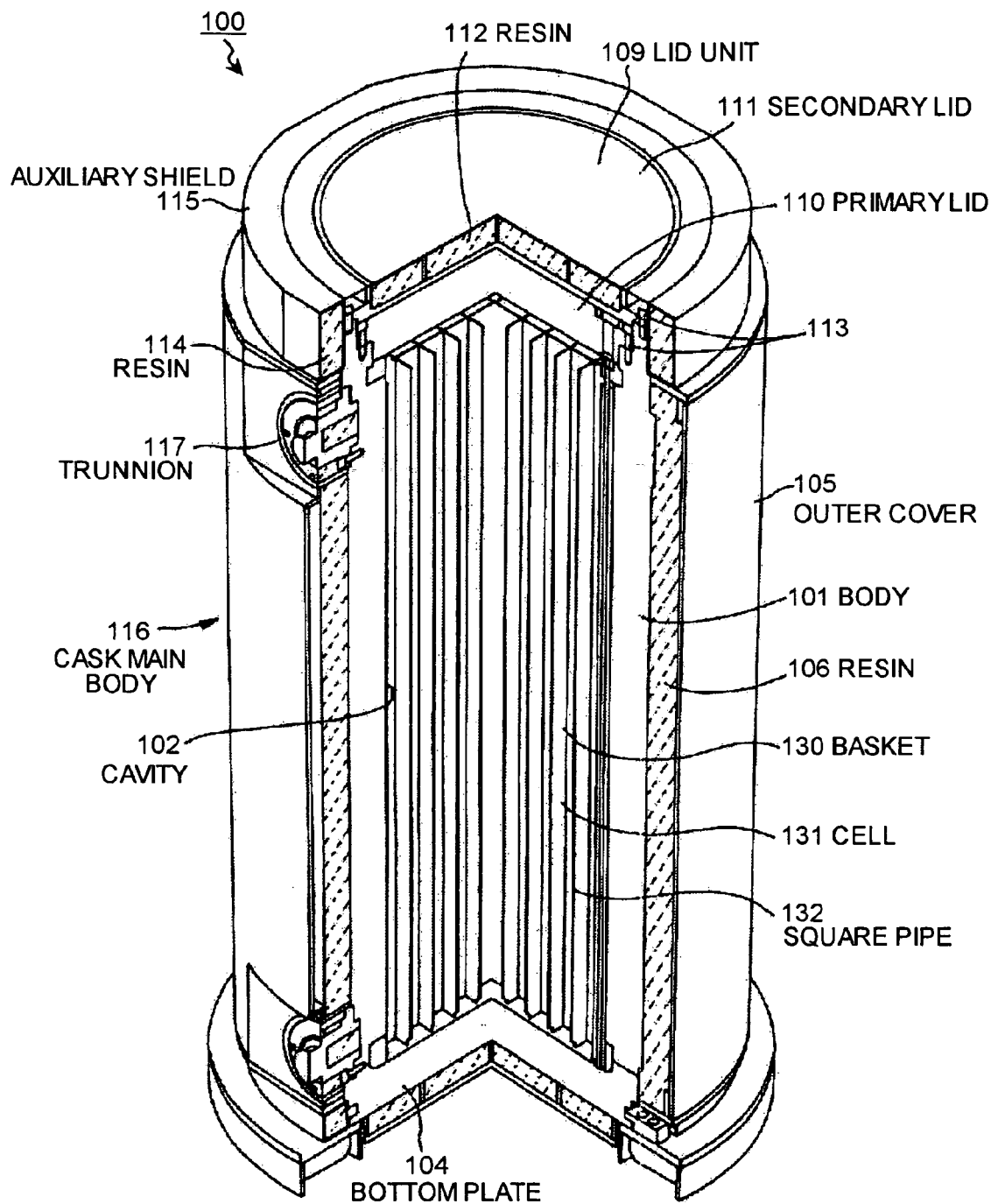
FIG. 4 is a perspective view of the configuration of a cask according to the present invention.
Figure 5:
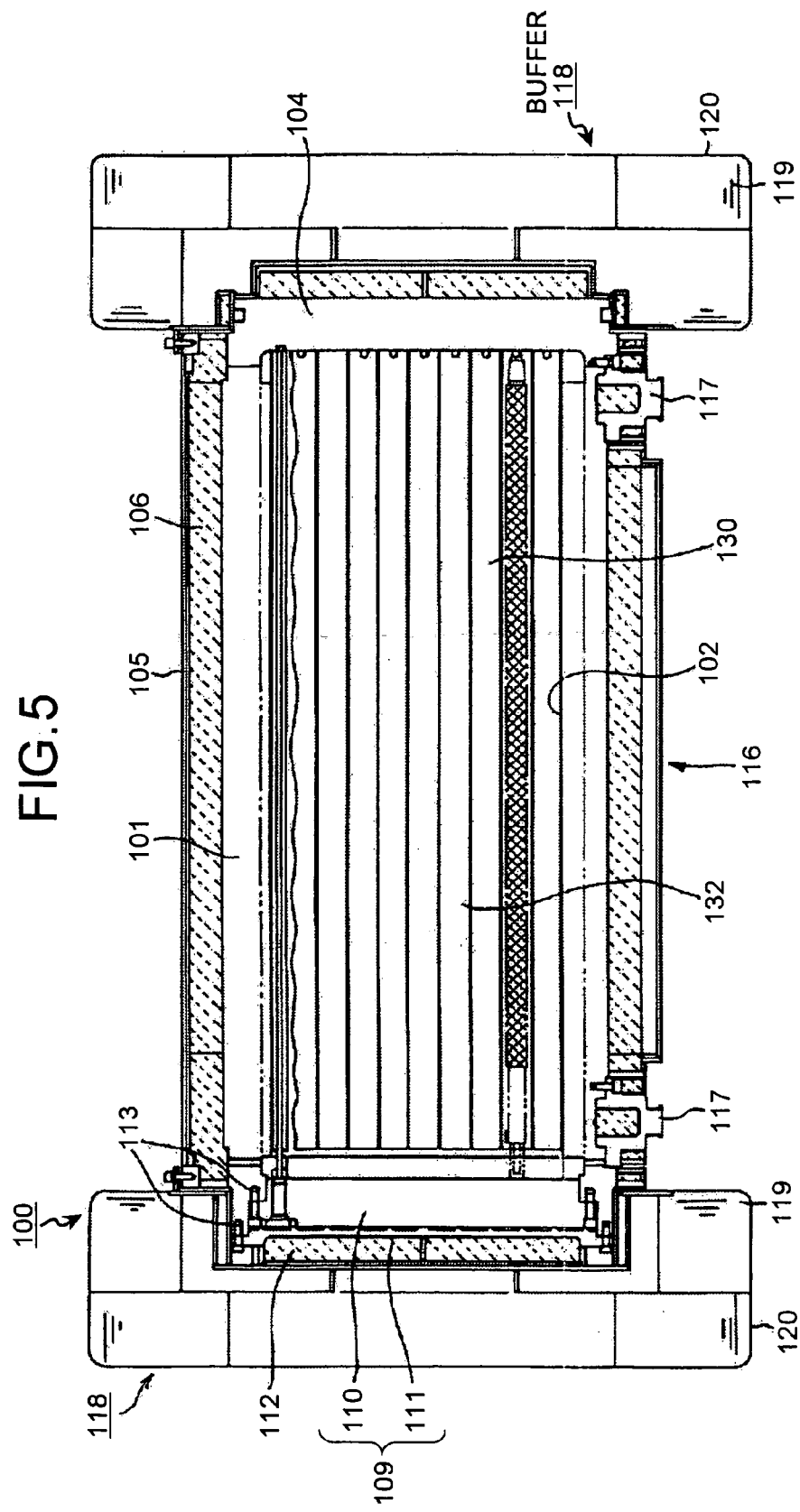
FIG. 5 is a vertical cross-sectional view of the configuration of the cask shown in FIG. 4.
Figure 6:
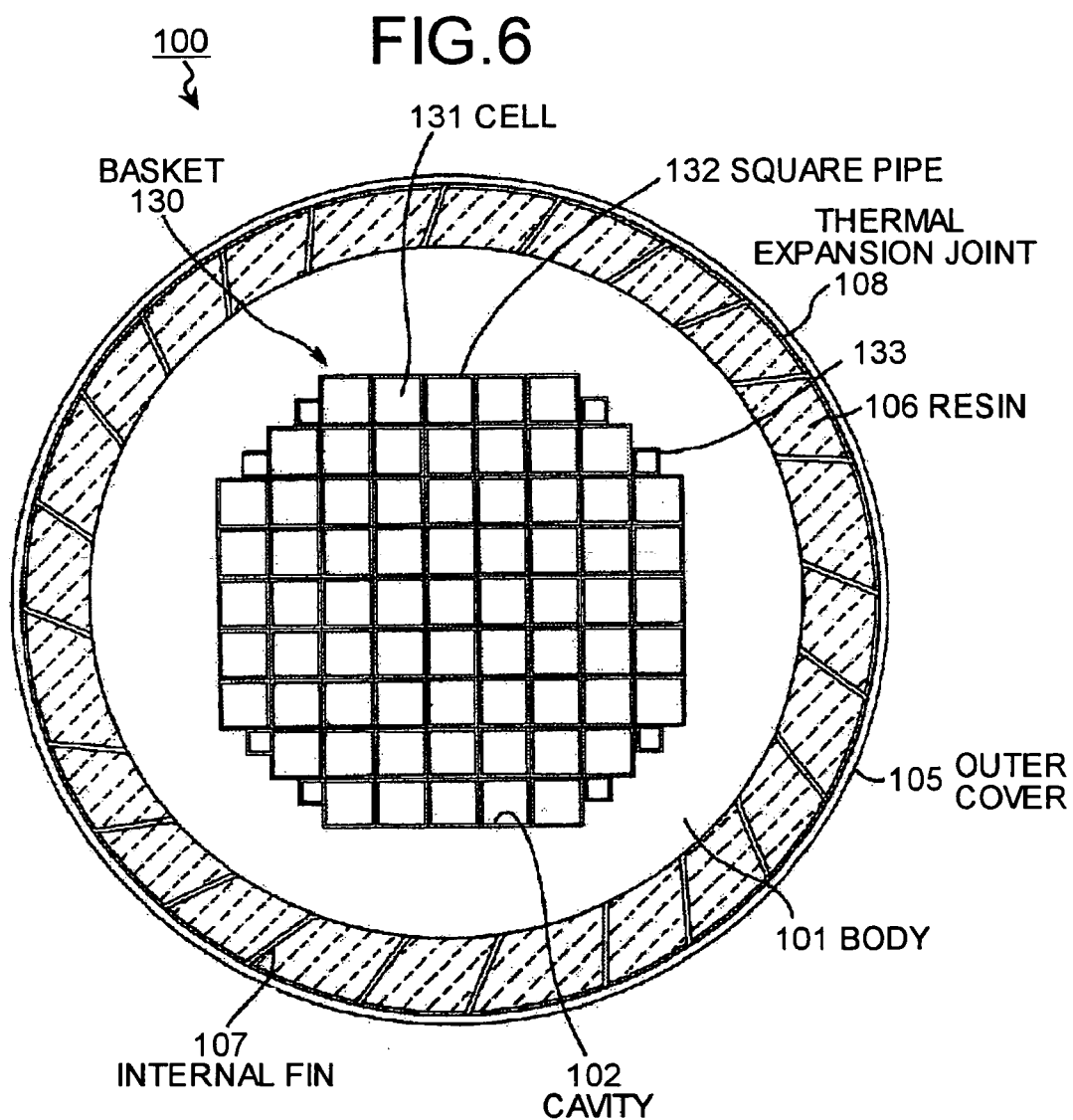
FIG. 6 is a transverse cross-sectional view of the configuration of the cask shown in FIG. 4.

FIG. 4 is a perspective view of a cask. FIG. 5 is a vertical cross-sectional view of the cask shown in FIG. 4. FIG. 6 is a transverse cross-sectional view of the cask shown in FIG. 4. A cask 100 is obtained by mechanically processing the inner surface of a cavity 102 of a body 101 so that the form of the inner surface and the outer periphery form of a basket 130 match. The inner surface of the cavity 102 is mechanically processed by, for example, milling by means of an exclusive processing machine. The body 101 and a bottom plate 104 are forged articles made of carbon steel having γ-rays shielding ability. Instead of carbon steel, stainless steel can be used. The body 101 and bottom plate 104 are bonded together by welding. For securing the airtightness as a pressure container, a metal gasket is provided between a primary lid 110 and the body 101.

A space between the body 101 and an outer cover 105 is filled with a resin 106 having a neutron shielding ability, which is a polymer material having a large amount of hydrogen, namely, the composition for neutron shield. A plurality of internal fins 107 made of copper for thermal conduction are welded between the body 101 and the outer cover 105, and the resin 106 in a fluid state is charged into spaces defined by the internal fins 107 through a not shown pipe and solidified by cooling. For uniformly dissipating heat, it is preferred that the internal fins 107 are provided with high density at a highly heated portion. A several-millimeter thermal expansion joint 108 is provided between the resin 106 and outer cover 105. The thermal expansion joint 108 is formed by placing a flatting die, which comprises a hot-melt adhesive having a heater buried, on the inner wall of the outer cover 105 and casting and solidifying the resin 106, and then melting and discharging the adhesive by heating the heater.

A lid unit 109 comprises the primary lid 110 and a secondary lid 111. The primary lid 110 is in the form of a disc made of stainless steel or carbon steel which shields γ-rays. The secondary lid 111 is in the form of a disc made of stainless steel or carbon steel, and has a resin 112 as a neutron shield, i.e., the neutron shield enclosed in the upper surface. The primary lid 110 and secondary lid 111 are fixed to the body 101 with bolts 113 made of stainless steel or carbon steel. Metal gaskets are provided individually between the primary lid 110 or secondary lid 111 and body 101 to secure the inside airtightness. An auxiliary shield 115 having a resin 114 enclosed is provided around the lid unit 109.

Trunnions 117 for hanging the cask 100 are provided on both sides of a cask main body 116. In FIG. 4, the auxiliary shield 115 is provided, but, when the cask 110 is carried, the auxiliary shield 115 is removed and a buffer 118 is fixed to the cask (see FIG. 5). The buffer 118 has a structure comprising a buffer material 119 comprised of, e.g., a red wood material incorporated into an outer cover 120 formed from a stainless steel material. A basket 130 is comprised of 69 square pipes 132 constituting a cell 131 for containing spent fuel assembly. In the square pipes 132, an aluminum composite or aluminum alloy obtained by adding powder of B (boron) or a B compound having a neutron absorbing ability to aluminum or aluminum alloy powder is used. As a neutron absorber, instead of boron, cadmium can be used.

The cask 100 described above is a large-size apparatus in the 100-ton class, and, by using the composition for neutron shield of the present invention as the resins 106, 112, 114 in the cask, not only can the cask be considerably reduced in weight while maintaining satisfactory neutron shielding ability and heat resistance, but also the time and burdensome operations required for the casting work of the resins 106, 112, 114 at portions with complicated structures, e.g., the internal fins 107 can be dramatically reduced due to the fluidity and the extended pot life of the composition.

Figure 7:
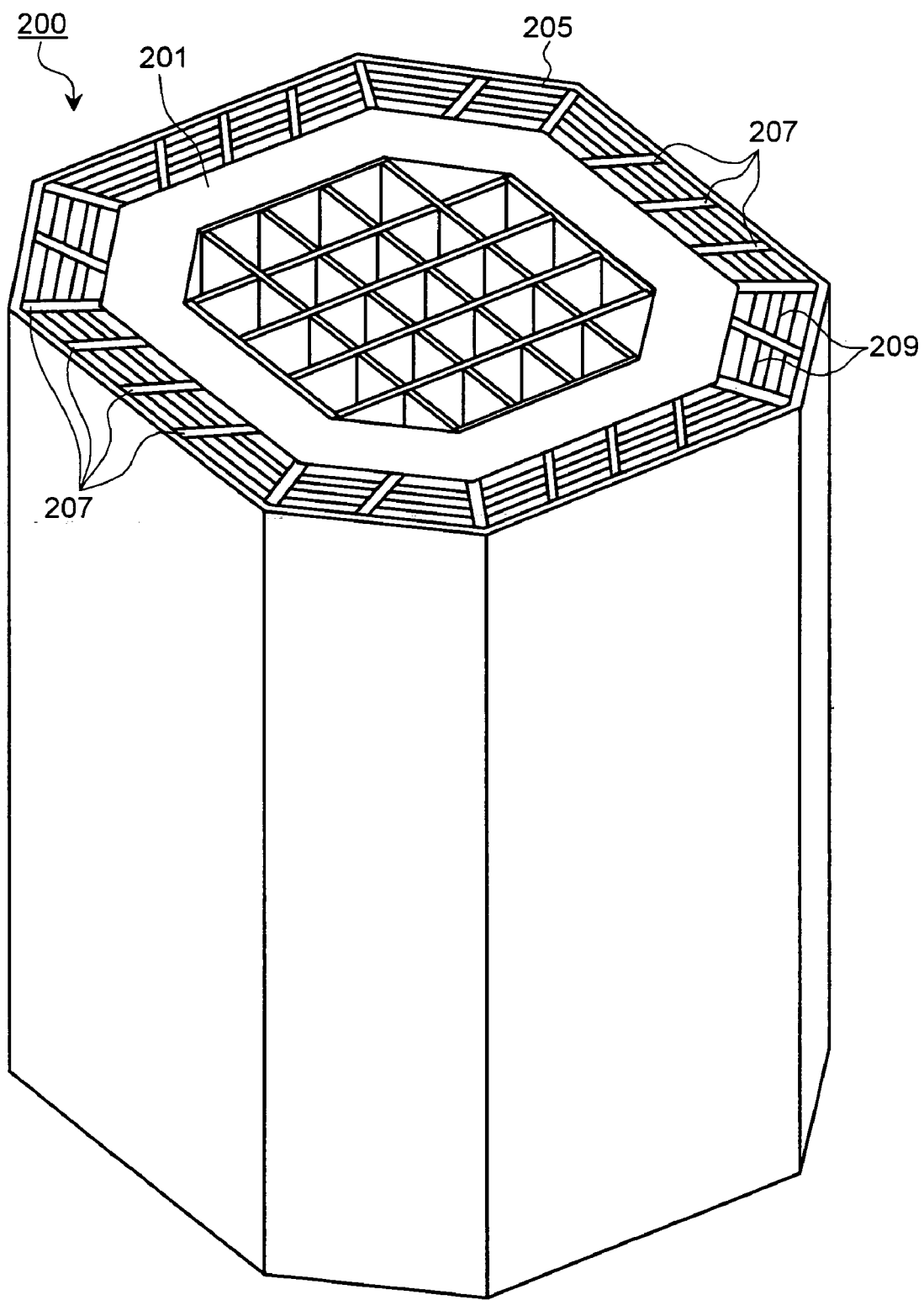
FIG. 7 is an explanatory view of the composition of the cask having a body having therein a basket comprised of a plate member.

The composition of the present invention is preferably used in a cask having a body having therein a basket comprised of a plate member shown in FIG. 7.

For absorbing neutrons, spaces 209 defined by a body 201, an outer cover 205, and two heat transfer fins 207 are filled with a resin, which is a polymer material containing a large amount of hydrogen and having a neutron shielding ability, namely, the composition for neutron shield. A neutron shield comprising the composition for neutron shield shields neutrons released from recycle fuel assembly to suppress neutrons which leak from the cask 200 to the accepted level or less.

The application of the composition of the present invention is not limited to the shield for use in the cask, and the composition can be used in various sites in apparatuses and facilities for preventing diffusion of neutrons, enabling effective neutron shielding.

The present invention is described further in detail with reference to the Examples below. However, the present invention is not limited by the Examples.

The neutron shielding ability was evaluated in terms of heat resistance indicated by weight reduction ratio. Almost all the weight reduction is caused by loss of water, which contains a large amount of hydrogen having a neutron moderation effect. In other words, a result such that the weight reduction ratio is large indicates that the water content is reduced due to poor heat resistance to lower the neutron shielding ability.

The γ-ray shielding ability is evaluated in terms of the density (g/cm3) of a composition for neutron shield. A composition having a density of about 1.62 g/cm3 to 1.72 g/cm3 can satisfactorily achieve γ-ray shielding.

Epoxy resins having the formulations shown in Table 1 were individually cured, and compared in terms of heat resistance. The heat resistance was indicated by the weight reduction ratio determined by a method in which a sample was held in a closed container at 200° C. for 2000 hours, and the container was opened at room temperature and then the sample was left to stand overnight to remove volatiles. The hydrogen content is generally measured by a CHN analyzer, and, in the present Examples, it was determined using a gas thermal conductivity detector type CHN analyzer. Magnesium hydroxide powder having a particle size of 3.3 micrometers was used.

Materials

Epoxy base resin

Epikure 801A (Trade Name) by Daito Sangyo Co., Ltd.

Epoxy curing agent

KD631 by Daito Sangyo Co., Ltd.

Refractory material

Comparative Example 1: Magnesium hydroxide powder CW-325LV by Sumitomo Chemical Co., Ltd.

Examples 1, 2: Magnesium hydroxide powder by Ube Material Industries, Ltd.

Boron carbide

KS-44 by Kyoritsu Chitsugyo

Density increasing agent

Copper powder FCC-115A by Fukuda Metal Foil Powder Co., Ltd.

TABLE 1

| Experiment No. | Comparative Example 1 | Example 1 | Example 2 |
|---|---|---|---|
| Epoxy base resin content (wt %) | 19.0 | 26.8 | 29.2 |
| Epoxy curing agent content (wt %) | 19.0 | 26.8 | 29.2 |
| Refractory material content (wt %) | 60.6 | 45.0 | 6.0 |
| Boron carbide content (wt %) | 1.4 | 1.4 | 1.4 |
| Density increasing agent content (wt %) | 0.0 | 0.0 | 34.3 |
| Density (g/cm3) | 1.65 | 1.65 | 1.65 |
| Hydrogen content (g/cm3) | 0.0997 | 0.0972 | 0.0972 |
| Heat resistance (wt %) | 3.2 | 0.2 | 0.2 |

In Comparative Example 1, in the evaluation of heat resistance at 200° C., the weight reduction was 3.2 mass percent. Therefore, it is presumed that the neutron shielding ability is lowered.

In Example 1, instead of aluminum hydroxide powder, magnesium hydroxide powder is used as a refractory material, and therefore the heat resistance is remarkably improved. However, magnesium hydroxide has a low hydrogen content, and hence the refractory material content must be reduced for substantially fixing the hydrogen content, so that the density is lowered. Therefore, the ability to shield γ-rays generated when neutrons are absorbed, which ability is substantially proportional to the density, is lowered.

In Example 2, for preventing lowering of the density, copper powder was added, together with the magnesium hydroxide powder. Therefore, even when using the magnesium hydroxide powder, the density similar to that in Comparative Example 1 can be maintained, so that the γ-ray shielding ability is maintained. In addition, by using no aluminum hydroxide powder but using the magnesium hydroxide powder, the heat resistance could be maintained even when the refractory material content was lowered.

Epoxy resins having the formulations shown in Table 2 were individually cured, and compared in terms of heat resistance. The heat resistance was indicated by the weight reduction ratio determined by a method in which a sample was held in a closed container at 200° C. for 2000 hours, and the container was opened at room temperature and then the sample was left to stand overnight to remove volatiles. Magnesium hydroxide powder having a particle size of 50 micrometers was used.

TABLE 2

| Experiment No. | Comparative Example 2 | Comparative Example 3 |
|---|---|---|
| Epoxy base resin content (wt %) | 19.0 | 18.0 |
| Epoxy curing agent content (wt %) | 19.0 | 18.0 |
| Refractory material content (wt %) | 60.6 | 62.0 |
| Boron carbide content (wt %) | 1.4 | 1.4 |
| Density (g/cm3) | 1.65 | 1.64 |
| Hydrogen content (g/cm3) | 0.0997 | 0.0978 |
| Heat resistance (wt %) | 3.2 | 3.2 |

Materials

Epoxy base resin

Comparative Example 2: Epikure 801A (Trade Name) by Daito Sangyo Co., Ltd.

Comparative Example 3:

Material (hydrogenated bisphenol A epoxy resin) obtained by hydrogenating bisphenol A of Epikure 801A (Daito Sangyo Co., Ltd.)

Epoxy curing agent

KD631 by Daito Sangyo Co., Ltd.

Refractory material

Comparative Example 2: Magnesium hydroxide powder CW-325LV by Sumitomo Chemical Co., Ltd.

Comparative Example 3: Magnesium hydroxide powder by Sob-ecray Boron carbide

KS-44 by Kyoritsu Chitsugyo

In Comparative Example 2, in the evaluation of heat resistance at 200° C., the weight reduction was 3.2 mass percent. Therefore, it is presumed that the neutron shielding ability is lowered. It is considered that this is caused due to the poor heat resistance of the aluminum hydroxide powder used as a refractory material.

In Comparative Example 3, instead of aluminum hydroxide powder, magnesium hydroxide powder was used, and therefore the heat resistance was remarkably improved. However, the hydrogen content of magnesium hydroxide $(Mg(OH)_2)$ is lower than that of aluminum hydroxide $(Al(OH)_3)$, and hence the hydrogen content of the neutron shield is lowered, thus lowering the neutron shielding ability. For overcoming this, as the epoxy base resin, a hydrogenated epoxy resin (hydrogenated bisphenol A epoxy resin) was used to increase the hydrogen content.

Epoxy resins having the formulations shown in Table 3 were individually cured, and compared in terms of heat resistance. The heat resistance was obtained in the similar manner to Experimental Examples 1 and 2. Magnesium hydroxide powder having a particle size of 3.3 micrometers was used.

Materials

Epoxy base resin

Comparative Example 4: Epikure 801A (Trade Name) by Daito Sangyo Co., Ltd.

Example 3: Material (hydrogenated bisphenol A epoxy resin) obtained by hydrogenating bisphenol A of Epikure 801A (Daito Sangyo Co., Ltd.)

Epoxy curing agent

KD631 by Daito Sangyo Co., Ltd.

Refractory material

Comparative Example 4: Magnesium hydroxide powder CW-325LV by Sumitomo Chemical Co., Ltd.
Examples 3: Magnesium hydroxide powder by Ube Material Industries, Ltd.
Boron carbide
KS-44 by Kyoritsu Chitsugyo
Density increasing agent
Iron powder #200 by Kobe Sangyo Chutetsu-hun

TABLE 3

| Experimental No. | Comparative Example 4 | Example 3 |
|---|---|---|
| Epoxy base resin content (wt %) | 19.0 | 24.8 |
| Epoxy curing agent content (wt %) | 19.0 | 24.8 |
| Refractory material content (wt %) | 60.6 | 19.0 |
| Boron carbide content (wt %) | 1.4 | 1.4 |
| Density increasing agent content (wt %) | 0.0 | 30.0 |
| Density (g/cm$^3$) | 1.65 | 1070 |
| Hydrogen content (g/cm$^3$) | 0.0997 | 0.102 |
| Heat resistance (wt %) | 3.2 | 0.2 |

In Comparative Example 4, in the evaluation of heat resistance at 200° C., the weight reduction was 3.2 mass percent. Therefore, it is presumed that the neutron shielding ability is lowered.

In Example 3, a hydrogenated epoxy resin (hydrogenated bisphenol A epoxy resin) was used as the epoxy base resin, and magnesium hydroxide powder was used as the refractory material and iron powder was added, and therefore the density, the hydrogen content, and the heat resistance were improved. That is, the shielding ability for both neutrons and γ-rays and heat resistance were improved.

Figure 8:
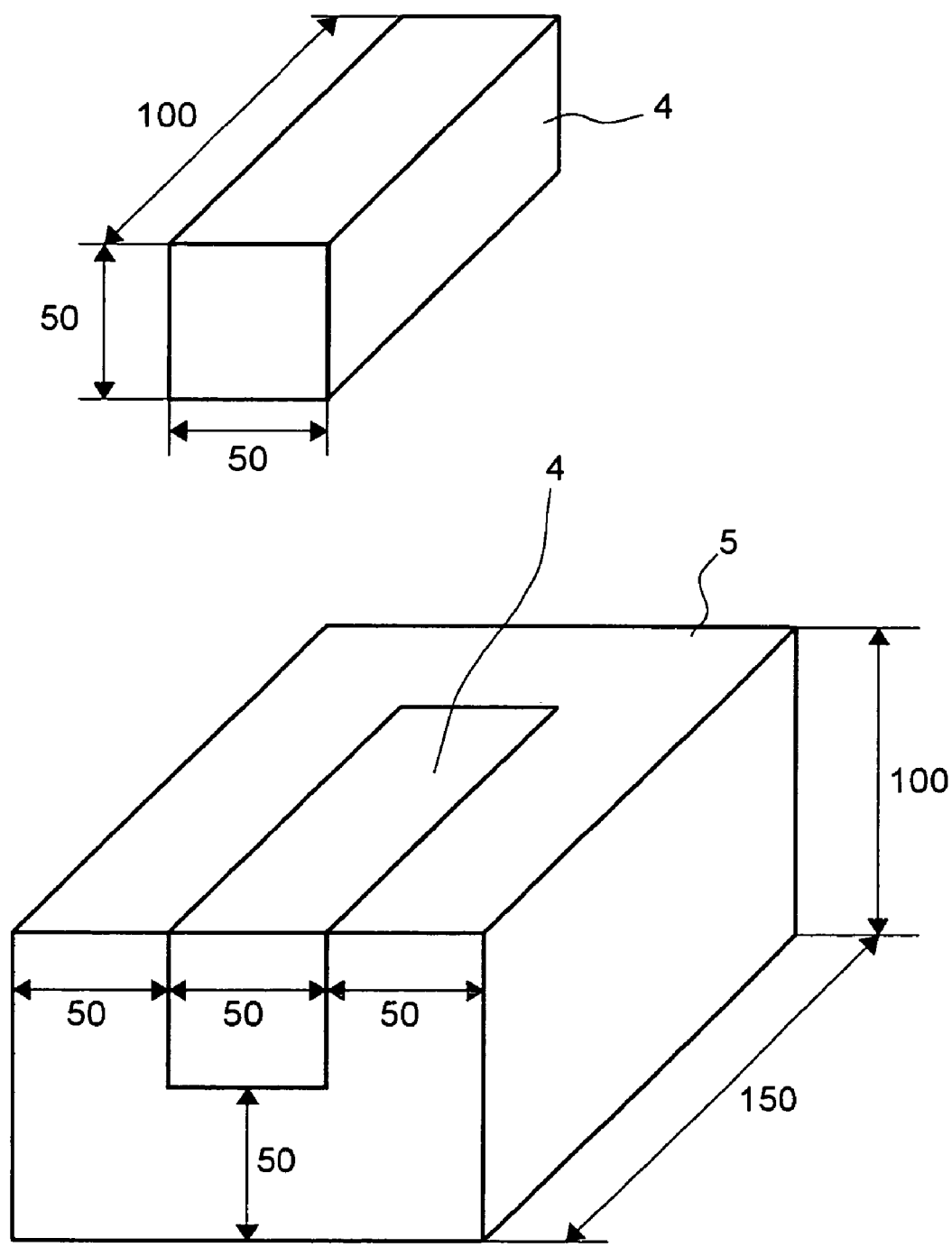
FIG. 8 depicts a fire resistance test container.

The commercially available epoxy material, magnesium hydroxide powder, and boron carbide shown below were mixed together at room temperature in a vacuum and deaerated, and charged into a 50 millimeter×50 millimeter× 100 millimeter die and cured at room temperature overnight, followed by complete curing under conditions at 130° C. for 24 hours, thus preparing sample 1 shown in FIG. 1. Considering the workability in production of a shield, the viscosity of the mixture of materials is generally 100 Pa·s or less, but 30 Pa·s was used as a yardstick in this experiment. The sample was placed in a fire resistance test container 5 shown in FIG. 8, and the whole of the container was sealed by a SUS steel plate and a molten tin stopper having a diameter of 5 millimeters was put on the upper surface of the test specimen at the central portion, and then allowed to stand in an atmosphere at 800° C. for 30 minutes. This fire resistance test is not under the fire resistance conditions for general materials but under substantially closed conditions corresponding to the conditions for the use of metal cask. When the fire resistance test container 5 is transferred to atmospheric conditions at room temperature, fire is found through the molten stopper but extinguishes soon by itself. After cooling to room temperature, the neutron shield was removed, and the inside state was examined and the weight remaining ratio was measured to know as to whether the neutron shield had a neutron shielding ability at a certain level after firing. The weight remaining ratio was determined by the same method as that for the heat resistance in Experimental Examples 1 and 2, and the viscosity of the mixture was determined using a Brookfield viscometer. Continuous voids are examined by knowing as to whether a 10-millimeter mesh obtained by dividing an arbitrary cross-section of the neutron shield has a space portion penetrating the mesh. When a continuous void is generated, neutrons pass through it, thus considerably lowering the neutron shielding ability.

Materials
Epoxy base resin:
DT-448 by Daito Sangyo Co., Ltd. (Bisphenol A derivative-containing mixed resin)
Epoxy curing agent:
I-5731 by Daito Sangyo Co., Ltd. (Amine curing agent)
Magnesium hydroxide powder
Particle size 50 micrometers, 15 micrometers, 5 micrometers by Sob-ecray
Particle size 3.3 micrometers by Ube Material Industries, Ltd.
Particle size 1.7 micrometers, 1.0 micrometers by Kyowa Chemical Industry Co., Ltd.
Particle size 1.4 micrometers by Konosima Chemical Co., Ltd.
Boron carbide
KS-44 by Kyoritsu Chitsugyo As shown in Table 4, in Examples 4 to 7, a tendency that a continuous void was unlikely to be generated in the neutron shield, excluding the surface layer, when the weight remaining ratio was 50% or more, was recognized. The weight remaining ratio corresponds to a value obtained by: 100(%)-weight reduction ratio (%).

An effect of the addition of carbon powder was confirmed by the same method as that used in Experimental Example 4 (frequency of experiments: 1 to 5). As the carbon powder, carbon black (Model No. 05-1530-5), manufactured by Sigma Aldrich Japan K. K., was used. Ni powder, manufactured by Yamaishimetals Co. Ltd., was used as a density increasing agent. As shown in Table 5, the effect was recognized in Examples 9 to 14 in which the carbon powder was added, and, especially in Examples 11 to 14, no continuous void was found.

An effect of the addition of magnesium hydroxide powder and carbon powder was confirmed by the same method as that used in Experimental Example 4. As the carbon powder, carbon black (Model No. 05-1530-5), manufactured by Sigma Aldrich Japan K. K., was used. Ni powder, manufactured by Yamaishimetals Co. Ltd., was used as a density increasing agent. As shown in Table 6, a tendency that a void was unlikely to be generated by a synergistic effect of the combination of the magnesium hydroxide powder having a particle size of 1.5 micrometers to 15 micrometers and carbon powder was recognized. The cross-section was observed, and, as a result, it was found that the sample in Example 18 using magnesium hydroxide powder having a particle size of 3.3 micrometers kept the densest structure after firing by a synergistic effect of the magnesium hydroxide powder and carbon powder.

TABLE 4

| Experiment No. | Comparative Example 5 | Example 4 | Example 5 | Example 6 | Example 7 | Comparative Example 6 | Comparative Example 7 |
|---|---|---|---|---|---|---|---|
| Particle size of Magnesium hydroxide ($\mu$m) | 50 | 15 | 5 | 3.3 | 1.7 | 1.4 | 1.0 |
| Epoxy base resin content (wt %) | 32.4 | 38.0 | 42.0 | 43.7 | 46.6 | 48.3 | 50.0 |
| Epoxy curing agent content (wt %) | 10.8 | 12.7 | 14.0 | 14.6 | 15.5 | 16.1 | 16.7 |
| Magnesium hydroxide content (wt %) | 55.4 | 48.0 | 42.6 | 40.3 | 36.5 | 34.2 | 32.0 |
| Boron carbide content (wt %) | 1.4 | 1.4 | 1.4 | 1.4 | 1.4 | 1.4 | 1.4 |
| Viscosity of mixture (Pa · s) | 26 | 27 | 29 | 28 | 27 | 27 | 26 |
| Weight remaining ratio (wt %) | 77 | 78 | 79 | 81 | 80 | 78 | 75 |
| Continuous void | Exists | *1 | Does not exist | Does not exist | *2 | Exists | Exists |

*1 Continuous void generated at probability of about 50%
*2 Continuous void generated at probability of about 30%

TABLE 5

| Experiment No. | Example 8 | Example 9 | Example 10 | Example 11 | Example 12 | Example 13 | Example 14 |
|---|---|---|---|---|---|---|---|
| Particle size of Magnesium hydroxide ($\mu$m) | 15 | 15 | 15 | 15 | 15 | 15 | 15 |
| Carbon powder content (wt %) | 0.0 | 0.02 | 0.05 | 0.1 | 0.2 | 0.3 | 0.5 |
| Epoxy base resin content (wt %) | 32.7 | 32.7 | 32.7 | 32.7 | 32.6 | 32.6 | 32.5 |
| Epoxy curing agent content (wt %) | 10.9 | 10.9 | 10.9 | 10.9 | 10.9 | 10.9 | 10.9 |
| Magnesium hydroxide content (wt %) | 46.0 | 46.0 | 46.0 | 45.9 | 45.9 | 45.8 | 45.7 |
| Ni powder content (wt %) | 9.0 | 9.0 | 9.0 | 9.0 | 9.0 | 9.0 | 9.0 |
| Boron carbide content (wt %) | 1.4 | 1.4 | 1.4 | 1.4 | 1.4 | 1.4 | 1.4 |
| Viscosity of mixture (Pa · s) | 29 | 29 | 29 | 30 | 32 | 40 | 86 |
| Weight remaining ratio (wt %) | 78 | 79 | 81 | 82 | 82 | 81 | 82 |
| Continuous void | Exists | *1 | *2 | Does not exist | Does not exist | Does not exist | Does not exist |
| Void ratio (area %) | 14 | 10 | 5 | 1 | <1 | <1 | <1 |

*1 Probability of continuous void generation: equal to or more than 50% and less than 100%
*2 Probability of continuous void generation: equal to or more than 0% and less than 50%

TABLE 6

| Experiment No. | Example 15 | Example 16 | Example 17 | Example 18 | Example 19 | Example 20 | Example 21 |
|---|---|---|---|---|---|---|---|
| Particle size of Magnesium hydroxide ($\mu$m) | 50 | 15 | 5 | 3.3 | 1.7 | 1.4 | 1.0 |
| Carbon powder content (wt %) | 0.1 | 0.1 | 0.1 | 0.1 | 0.1 | 0.1 | 0.1 |
| Epoxy base resin content (wt %) | 25.9 | 32.7 | 37.0 | 38.6 | 41.2 | 42.6 | 44.6 |
| Epoxy curing agent content (wt %) | 8.6 | 10.9 | 12.3 | 12.9 | 13.7 | 14.2 | 14.9 |
| Magnesium hydroxide content (wt %) | 55.0 | 45.9 | 40.2 | 38.1 | 34.6 | 32.7 | 30.0 |
| Ni powder content (wt %) | 9.0 | 9.0 | 9.0 | 9.0 | 9.0 | 9.0 | 9.0 |
| Boron carbide content (wt %) | 1.4 | 1.4 | 1.4 | 1.4 | 1.4 | 1.4 | 1.4 |
| Viscosity of mixture (Pa · s) | 27 | 28 | 30 | 29 | 28 | 28 | 27 |
| Weight remaining ratio (wt %) | 77 | 78 | 79 | 82 | 82 | 78 | 76 |
| Continuous void | Exists | Does not exist | Does not exist | Does not exist | Exists | Exists | Exists |

To 38.6 wt % of a hydrogenated bisphenol A base material was added 12.9 wt % of a curing agent comprised mainly of an alicyclic amine to form an epoxy resin raw material, and to the raw material were added 30.0 wt % of magnesium hydroxide powder (particle size adjusted) as a refractory material and 1.5 wt % of B4C as a neutron absorber, and then 17.0 wt % of lead powder was added thereto and mixed with one another at room temperature in a vacuum, and the resultant mixture was charged into a die and cured at room temperature for one day, followed by curing at 140° C. for 10 hours, obtaining a neutron shield in Example 22.

An analysis of this material showed a formulation: hydrogen: 0.103 g/ml; carbon: 0.581 g/ml; nitrogen: 0.025 g/ml; boron: 0.019 g/ml; magnesium: 0.187 g/ml; and lead: 0.279 g/ml, and the density was 1.640 g/ml.

As the density increasing agents other than lead (Pb) used in Example 22, Bi2O3 (Example 23), ZrO2 (Example 24), and Cu (Example 25) were individually used to obtain neutron shields.

Table 7 shows comparisons in terms of the neutron shielding ability between Examples 22, 23, and 24 and Comparative Example 8 (neutron shield for BWR metal cask) in which no metal powder was added as conventional. As the neutron shield for BWR metal cask in Comparative Example 8, one corresponding to the conventional product was produced and used.

Comparative Example 9 corresponds to an example in which the hydrogen content and the density are adjusted using only aluminum hydroxide without adding metal powder or metal oxide powder.

added thereto and mixed with one another at room temperature in a vacuum, and the resultant mixture was charged into a die and cured at room temperature for one day, followed by curing at 140° C. for 10 hours, obtaining a neutron shield in Example 25.

Table 7 shows a comparison in terms of the neutron shielding ability between Example 25 and Comparative Example 8 (neutron shield for BWR metal cask) in which no metal powder was added as conventional.

As shown in Table 7, in Example 25, by adding metal powder to the neutron shielding material comprised mainly of a polymer, the neutron shielding ability equivalent to that of the conventional one (neutron shield for BWR metal cask) can be secured even when using an epoxy resin which

TABLE 7

| Experiment No. | Example 22 | Example 23 | Example 24 | Example 25 | Comparative Example 8 | Comparative Example 8 |
|---|---|---|---|---|---|---|
| Density (g/ml) | 1.64 | 1.588 | 1.565 | 1.620 | 1.618 | 1.738 |
| Hydrogen content (g/ml) | 0.103 | 0.103 | 0.102 | 0.098 | 0.094 | 1.044 |
| Carbon content (g/ml) | 0.581 | 0.584 | 0.575 | 0.583 | 0.452 | 0.403 |
| Nitrogen content (g/ml) | 0.025 | 0.025 | 0.025 | 0.025 | 0.019 | 0.018 |
| Boron content (g/ml) | 0.019 | 0.019 | 0.018 | 0.017 | 0.016 | 0.019 |
| Aluminum content (g/ml) | 0.000 | 0.000 | 0.000 | 0.000 | 0.339 | 0.391 |
| Magnesium hydroxide content (g/ml) | 0.187 | 0.181 | 0.178 | 0.187 | 0.000 | 0.000 |
| Density increasing agent content (g/ml) | 0.279 (Pb) | 0.214 (Bi) | 0.214 (Bi) | 0.040 (Cu) | — | 0.000 |
| Oxygen content (g/ml, estimated) | 0.394 | 0.393 | 0.424 | 0.376 | 0.698 | 0.785 |
| Initial viscosity after mixing (mPa · s) | 2,000 | 2,000 | 2,000 | 10,000 | 25,000 | >100,000 |
| Total radiation dose (dose in Comparative Example 8 taken as 1) | 0.76 | 0.81 | 0.77 | 0.98 | 1.00 | 0.76 |
| Weight remaining ratio (wt %) after fire resistance test at 800° C. for 30 minutes | 70 | 69 | 69 | 70 | 74 | 70 |

As shown in Table 7, in Example 22, by adding metal powder to the neutron shielding material comprised mainly of a polymer, the hydrogen content can be increased without lowering the density of the material (in the range of 1.62 g/ml to 1.72 g/ml).

Therefore, the neutron absorption can be increased while maintaining excellent secondary γ-ray shielding ability, thus making it possible to improve the neutron shielding ability.

When the hydrogen content and the density are adjusted using only aluminum hydroxide, as seen from the results of Comparative Example 9 in Table 7, the initial viscosity after mixing markedly increases due to the increase of the solids content.

In this case, the application properties of the neutron shielding material becomes poor, leading to problems that the production cost is increased and preparation of large-size shaped articles is difficult.

Experimental Example 8

To 38.7 wt % of a general bisphenol A base material, which was not hydrogenated, was added 12.9 wt % of a curing agent comprised mainly of an alicyclic amine to form an epoxy resin raw material, and to the raw material were added 28.0 wt % of magnesium hydroxide powder (particle size adjusted) as a refractory material and 1.5 wt % of B4C as a neutron absorber, and then 19.0 wt % of Cu powder was is not hydrogenated to increase the hydrogen content. Therefore, the process for producing a neutron shield can be simplified.

The present invention is not limited by the above embodiments, and in implementing stages, various modifications can be made without departing from the spirits of the invention. Further, the embodiments may properly be combined to a maximum extent, and operational advantages by the combinations of the embodiments can be obtained. Furthermore, various stages of the invention are included in the embodiments, and various inventions can be extracted by proper combinations of multiple constituent features disclosed herein. For example, even if some constituent features are cancelled from all constituent features shown in the embodiments, at least one of the problems mentioned in the column of "Problems to be solved by the Invention" can be solved. In addition, if at least one of the effects mentioned in the column of "Effects of the Invention" can be obtained, the constitution, from which the constituent features are cancelled, may be extracted as an invention.

As described above in detail, the composition for neutron shield of the present invention contains a neutron shielding material comprised mainly of a polymer and magnesium hydroxide powder having a particle size of 1.5 micrometers to 15 micrometers, and therefore it advantageously shields neutrons and has excellent fire resistance. The magnesium hydroxide powder having a particle size adjusted is used and hence the composition is improved in workability. The addition of carbon powder to the composition can further improve the neutron shielding ability.

The composition for neutron shield of the present invention contains a neutron shielding material comprised mainly of a polymer, a refractory material, and a density increasing agent, and therefore it advantageously shields both neutrons and γ-rays and has excellent fire resistance. By selecting magnesium hydroxide powder as the refractory material and adjusting its particle size, the composition can be improved in workability. The addition of carbon powder to the composition can further improve the neutron shielding ability. The hydrogen content can be increased while maintaining the density of the material at a fixed value without lowering it, and therefore the neutron shielding ability can be improved without providing a structure for shielding γ-rays around the neutron shield body.

The composition for neutron shield of the present invention comprises 20 mass percent to 55 mass percent of the neutron shielding material comprised mainly of a polymer, 4 mass percent to 55 mass percent of the curing agent, 5 mass percent to 60 mass percent of the refractory material, 5 mass percent to 40 mass percent of the density increasing agent, and 0.5 mass percent to 10 mass percent of a boron compound, and therefore it advantageously shields both neutrons and γ-rays and has excellent fire resistance.

The cask of the present invention comprises a neutron shield which comprises the above composition for neutron shield, therefore it can effectively shield both neutrons and γ-rays.

In the method for producing a neutron shield of the present invention, the hydrogen content can be increased by replacing part of the additives other than the epoxy resin by the density increasing agent. By replacing part of the constituents other than the neutron shielding material comprised mainly of a polymer, the epoxy resin content can be increased while maintaining the specific gravity (1.62 g/cm$^3$ to 1.72 g/cm$^3$) of the composition for neutron shield, so that a neutron shield having a high hydrogen content can be produced, enabling effective neutron shielding. That is, a neutron shield having both excellent neutron shielding ability and excellent γ-ray shielding ability can be produced.

INDUSTRIAL APPLICABILITY

As mentioned above, the composition for neutron shield of the present invention is suitable for composition for use in producing a neutron shield advantageously used in a cask for storage and transport of spent fuel.

The invention claimed is:

1. A composition for a neutron shield suitable for a cask, comprising:
   20 mass percent to 55 mass percent of neutron shielding material composed mainly of a polymer;
   a curing agent of 4 mass percent to 55 mass percent:
   a refractory material of 5 mass percent to 60 mass percent:
   a density increasing agent of 5 mass percent to 40 mass percent; and
   a boron compound of 0.5 mass percent to 10 mass percent,
   wherein the neutron shielding material, the curing agent, the refractory material and the density increasing agent are included in such amounts that the composition has a specific gravity in a range of 1.62 g/cm$^3$ to 1.72 g/cm$^3$.

2. The composition for neutron shield according to claim 1, wherein the neutron shielding material composed mainly of a polymer is an epoxy resin.

3. The composition for neutron shield according to claim 1, wherein the neutron shielding material composed mainly of a polymer is a hydrogenated epoxy resin.

4. The composition for neutron shield according to claim 1, wherein the neutron shielding material composed mainly of a polymer is a hydrogenated bisphenol A epoxy resin.

5. The composition for neutron shield according to claim 1, further comprising carbon powder.

6. The composition for neutron shield according to claim 5, wherein the carbon powder comprises 0.02 mass percent to 4 mass percent of carbon black.

7. A composition for a neutron shield suitable for a cask, comprising:
   20 mass percent to 55 mass percent of a neutron shielding material composed mainly of a polymer;
   5 mass percent to 60 mass percent of a refractory material; and
   5 mass percent to 40 mass percent of a density increasing agents
   wherein the neutron shielding material, the refractory material and the density increasing agent are included in such amounts that the composition has a specific gravity in a range of 1.62 g/cm$^3$ to 1.72 g/cm$^3$.

8. The composition for neutron shield according to claim 1, wherein the refractory material is magnesium hydroxide powder.

9. The composition for neutron shield according to claim 8, wherein the magnesium hydroxide powder has a particle size of 1.5 micrometers to 15 micrometers.

10. The composition for neutron shield according to claim 1, wherein the density increasing agent has a density of 5.0 g/ml or more.

11. The composition for neutron shield according to claim 7, wherein the density increasing agent is metal powder.

12. The composition for neutron shield according to claim 7, wherein the density increasing agent is metal oxide powder.

13. The composition for neutron shield according to claim 11, wherein the density increasing agent is metal powder having a melting point of 350° C. or higher.

14. The composition for neutron shield according to claim 13, wherein the metal powder having a melting point of 350° C. or higher is any one of Cr, Mn, Fe, Ni, Cu, Sb, Bi, U, and W.

15. The composition for neutron shield according to claim 12, wherein the density increasing agent is metal oxide powder having a melting point of 1000° C. or higher.

16. The composition for neutron shield according to claim 15, wherein the metal oxide powder having a melting point of 1000° C. or higher is any one of NiO, CuO, ZnO, ZrO$_2$, SnO, SnO$_2$, WO$_2$, CeO$_2$, UO$_2$, PbO, and WO$_3$.

17. The composition for neutron shield according to claim 10, wherein the density increasing agent has a density in a range of 5.0 g/ml and 22.5 g/ml.

18. The composition for neutron shield according to claim 17, wherein the density increasing agent has a density in a range of 6.0 g/ml and 15 g/ml.

* * * * *